(12) United States Patent
Martin et al.

(10) Patent No.: US 11,376,700 B2
(45) Date of Patent: Jul. 5, 2022

(54) LOAD MEASURING ARRANGEMENT FOR A COLLET ASSEMBLY

(71) Applicant: Honda Motor Co., Ltd., Tokyo (JP)

(72) Inventors: Jeffrey D. Martin, Troy, OH (US);
Gary L. Diller, Coldwater, OH (US)

(73) Assignee: Honda Motor Co., Ltd., Tokyo (JP)

( * ) Notice: Subject to any disclaimer, the term of this patent is extended or adjusted under 35 U.S.C. 154(b) by 757 days.

(21) Appl. No.: 16/379,503

(22) Filed: Apr. 9, 2019

(65) Prior Publication Data

US 2020/0324381 A1 Oct. 15, 2020

(51) Int. Cl.
*B23Q 17/00* (2006.01)
*B23B 31/20* (2006.01)

(52) U.S. Cl.
CPC .......... *B23Q 17/005* (2013.01); *B23B 31/202* (2013.01); *B23B 2231/20* (2013.01); *B23B 2270/483* (2013.01); *Y10T 279/21* (2015.01)

(58) Field of Classification Search
CPC .............. B23B 31/202; B23B 31/4006; B23B 2231/20; B23B 2270/0483; B23Q 17/005; B23Q 17/002; G01N 3/04; G01N 2203/04
See application file for complete search history.

(56) References Cited

U.S. PATENT DOCUMENTS

| 5,149,111 A | 9/1992 | Han |
| 9,352,436 B2 | 5/2016 | Hiestand |

FOREIGN PATENT DOCUMENTS

| JP | 3398042 B2 | 4/2003 |
| WO | 9215418 A1 | 9/1992 |
| WO | 2018095471 A1 | 5/2018 |

*Primary Examiner* — Chwen-Wei Su
(74) *Attorney, Agent, or Firm* — Clifford B Vaterlaus; American Honda Motor Co., Inc.

(57) ABSTRACT

A load measuring arrangement for a collet assembly is provided. The load measuring arrangement includes a housing having a pocket which includes a first portion and a second portion. The load measuring arrangement further includes a first clamp member having a first groove and a second clamp member having a second groove. The first clamp member and the second clamp member are disposed in the first portion such that the first groove and the second groove together forms a receiving portion. A load measurement device is disposed next to the second clamp member in the second portion such that a load-responsive portion of the load measurement device is configured to be in contact with the second clamp member. The second clamp member is pushed outwards against the load-responsive portion when the receiving portion receives the collet assembly.

20 Claims, 6 Drawing Sheets

LOAD MEASURING ARRANGEMENT FOR A COLLET ASSEMBLY

BACKGROUND

Industries typically employ collet assemblies for several types of machining operations. Typically, a collet assembly includes a mounting member (e.g., an internal diameter (ID) gripping portion) to clamp a work-piece/machining tool with a suitable clamping force. In certain instances, it may be necessary to measure and evaluate the clamping force that the mounting member may apply on the work-piece/machining tool before using the collet assembly for machining operations, especially ones that require high work-piece/tool stability. Some of the conventional collet assemblies include an in-built sensing system which detects motion of the collet assembly to measure the clamping force. As collet assemblies come in varying sizes and clamping ranges to accommodate different sizes/types of tools/work-pieces, providing a dedicated in-built sensing system for each of such collet assemblies may not be a cost effective solution.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a load measuring arrangement for a collet assembly. The load measuring arrangement may include a housing having a pocket including a first portion and a second portion. The load measuring arrangement may further include a first clamp member having a first groove that may extend between two opposite surface portions of the first clamp member. The load measuring arrangement may further include a second clamp member having a second groove that may extend between two opposite surface portions of the second clamp member. The first clamp member and the second clamp member may be configured to be arranged next to each other and disposed in the first portion of the pocket such that the first groove and the second groove may together form a receiving portion. The load measuring arrangement may further include a load measurement device disposed next to the second clamp member in the second portion of the pocket such that a load-responsive portion of the load measurement device may be configured to be in contact with the second clamp member. The first clamp member may be pushed outwards against a wall of the first portion of the pocket and the second clamp member may be pushed outwards against the load-responsive portion when the receiving portion receives the collet assembly.

Another exemplary aspect of the disclosure provides a load measuring arrangement for a collet assembly. The load measuring arrangement may include a housing having a pocket including a first portion and a second portion. The load measuring arrangement may further include a first clamp member having a first groove. The load measuring arrangement may further include a second clamp member having a second groove. The first clamp member and the second clamp member may be configured to be arranged next to each other and disposed in the first portion of the pocket such that the first groove and the second groove may together form a receiving portion. The load measuring arrangement may further include a load measurement device disposed next to the second clamp member and secured to the second portion of the pocket such that a load-responsive portion of the load measurement device is configured to be in contact with the second clamp member. The second clamp member may be pushed outwards against the load-responsive portion when the receiving portion receives the collet assembly.

Another exemplary aspect of the disclosure provides a method of assembling a load measuring arrangement. The method may include arranging a first clamp member and a second clamp member next to each other in a first portion of a pocket of a housing such that a first groove in the first clamp member and a second groove in the second clamp member may together form a receiving portion. The method may further include disposing a load measurement device next to the second clamp member in a second portion of the pocket of the housing such that a load-responsive portion of the load measurement device is in contact with the second clamp member. The second clamp member may be pushed outwards against the load-responsive portion when the receiving portion receives a collet assembly.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
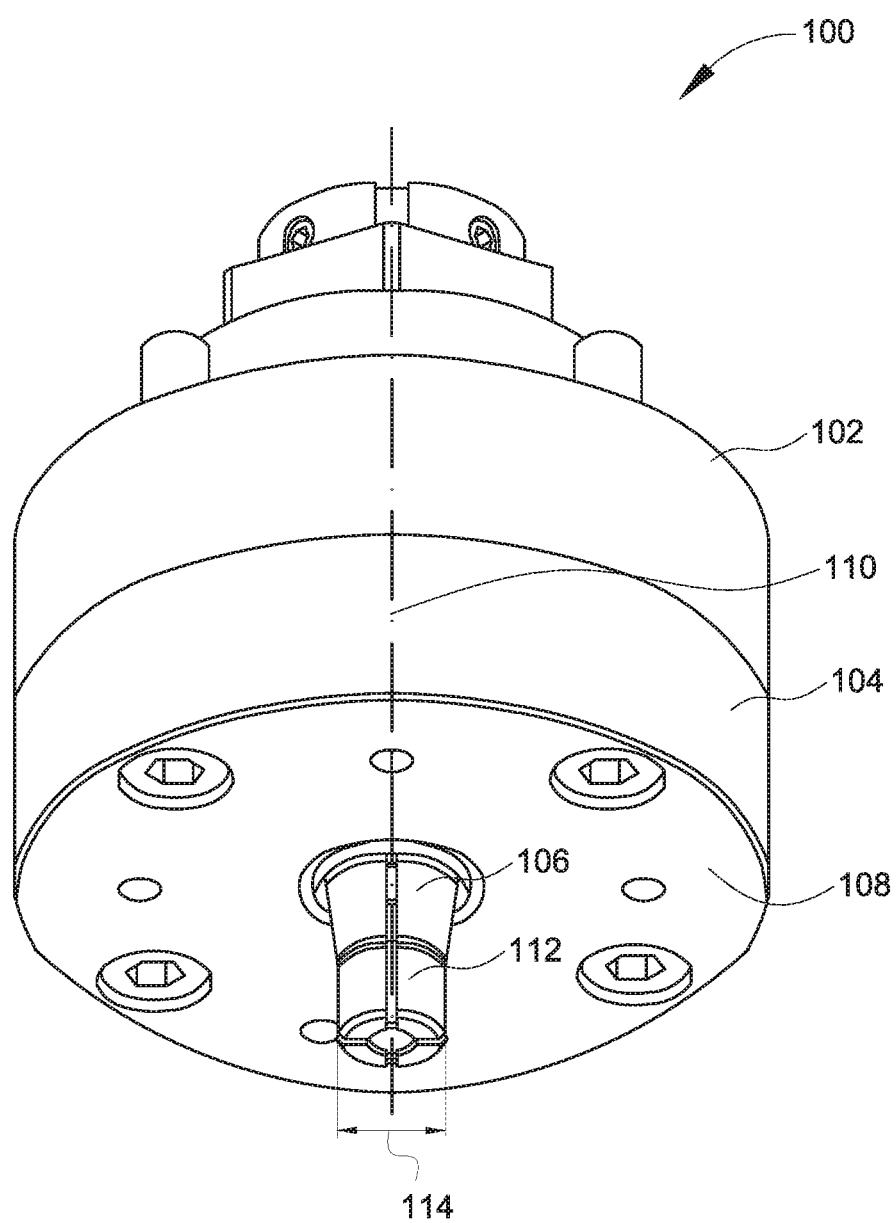
FIG. 1 illustrates a perspective view of an example collet assembly.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed load measuring arrangement for a collet assembly. Exemplary aspects of the disclosure provides a load measuring arrangement as a cost-effective solution to measure a clamping force of a collet assembly and to assess suitability and stability of the collet assembly for use with work-pieces/machining tools. The disclosed load measuring arrangement includes two clamp members which are replaceable members and may come with different groove sizes which can be selected/adjusted suitably so that the disclosed load measuring arrangement can be used as a universal measurement tool for measuring the clamping force of different collet assemblies of varying dimensions and clamping ranges, especially ones which lack a dedicated in-build sensing system for measurement of the clamping force. This may remove a need to embed in-built sensors in individual collet assemblies with particular clamping ranges and may help to reduce the cost for measuring the clamping force in collet assemblies.

The disclosed load measuring arrangement includes a load measurement device (e.g., a compression type load cell) having a load-responsive portion in contact with one of the two clamp members. When a receiving portion of the load measuring arrangement receives a collet assembly, the clamp members, in contact with the load-responsive portion, is pushed against the load-responsive portion, thereby inducing a strain on the load-responsive portion. The load measurement device may measure the strain as a load value which may be indicative of the clamping force of the received collet assembly. The disclosed load measuring arrangement allows for including different sizes of load measurement devices by using a shim-pack. This may help to select load measurement devices of suitable specifications for a particular type of collet assemblies or particular applications and may further allow for replacement of the load measurement device in case a defect is observed in the load measurement device.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 illustrates a perspective view of an example collet assembly. With reference to FIG. 1, there is shown a collet assembly 100 that may include a first assembly portion 102 and a second assembly portion 104. Each of the first assembly portion 102 and the second assembly portion 104 may have a substantially cylindrical structure. The first assembly portion 102 may be securely coupled to the second assembly portion 104 through a coupling mechanism (not shown in FIG. 1), for example, using a set of fasteners (not shown in FIG. 1). The second assembly portion 104 may include a mounting member 106 which may extend from a first face 108 of the second assembly portion 104 along a longitudinal axis 110. In FIG. 1, the mounting member 106 is shown to have a frusto-conical shape profile; however, disclosure may not be so limiting and in some embodiments, the mounting member 106 may have other structural profiles, such as a cylindrical profile. The mounting member 106 may include a plurality of jaw members 112, which may be configured to securely hold a work-piece or a machining tool (e.g., a drill bit) by application of a clamping force on the work-piece or the machining tool. The plurality of jaw members 112 may be radially disposed with respect to the longitudinal axis 110 and forms a first diameter 114.

In certain embodiments, the collet assembly 100 may be configured to be used as an inner diameter (ID) gripper for the work-piece or the machining tool. In such a case, the mounting member 106 may apply the clamping force on the work-piece or the machining tool in a radially outward direction with respect to the longitudinal axis 110. The gripping force in the radially outward direction may need to be measured to ensure suitability/stability of the collet assembly 100 for the work-piece or the machining tool. The present disclosure provides an exemplary load measuring arrangement which may be used to measure the clamping force (also referred to as a load) when the plurality of jaw members 112 expand in the radially outward direction.

It should be noted here that the collet assembly 100 is merely provided as an example and should not be construed as limiting for the disclosure. The present disclosure may be further applicable to other types of collet assemblies or work-piece holding devices, including but not limited to, an independent chuck or a combination chuck.

Figure 2A:
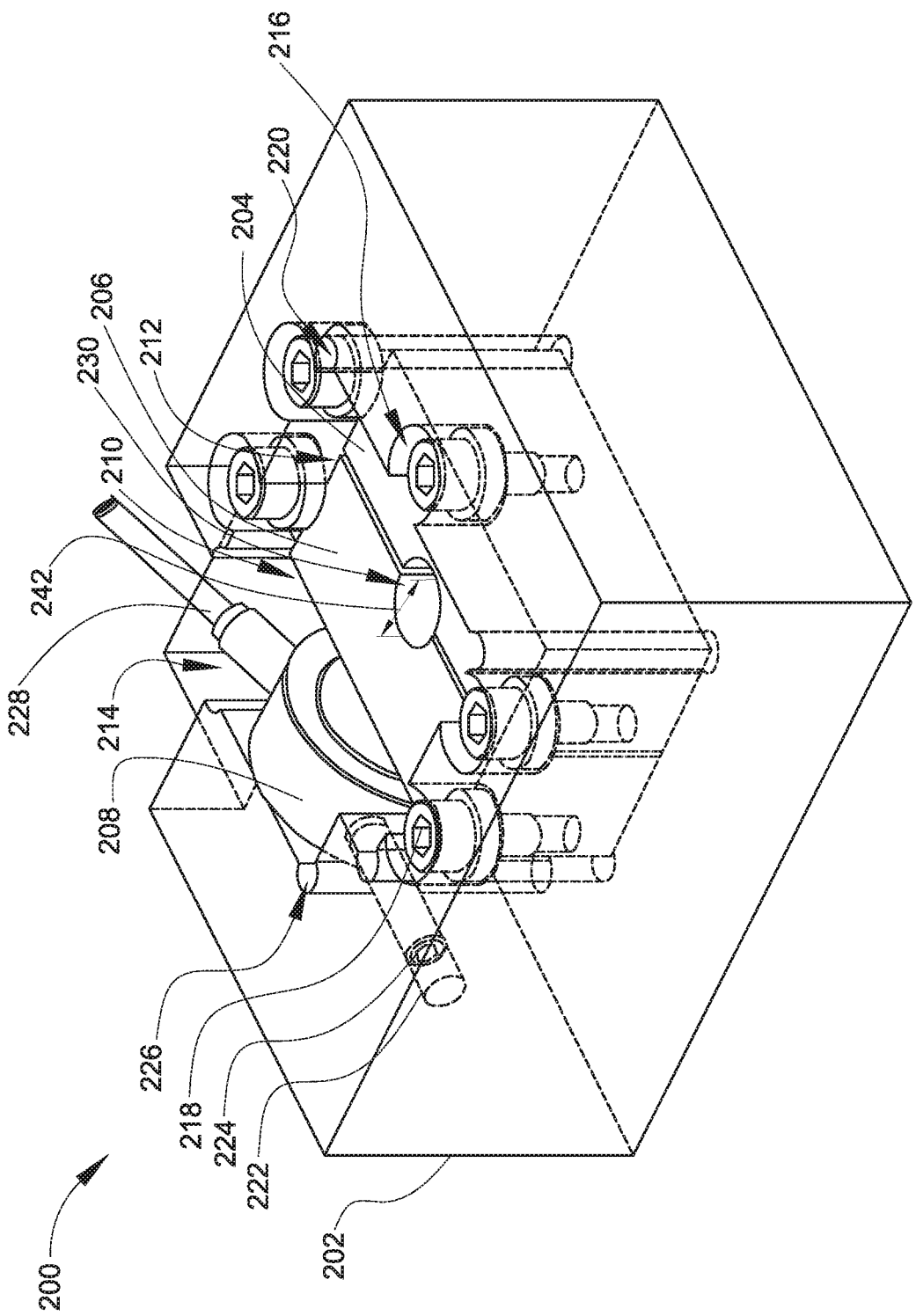
FIG. 2A illustrates a perspective view of a load measuring arrangement in a relaxed state, in accordance with an embodiment of the disclosure.

FIG. 2A illustrates a perspective view of a load measuring arrangement in a relaxed state, in accordance with an embodiment of the disclosure. FIG. 2A is explained in conjunction with elements from FIG. 1. With reference to FIG. 2A, there is shown a perspective view of a load measuring arrangement 200. The load measuring arrangement 200 may include a housing 202, a first clamp member 204, a second clamp member 206, and a load measurement device 208. The housing 202 may have a pocket 210 that includes a first portion 212 and a second portion 214. The first portion 212 of the pocket 210 may accommodate the first clamp member 204 and the second clamp member 206.

Similarly, the second portion 214 of the pocket 210 may accommodate the load measurement device 208.

The housing 202 may include a plurality of first cut-outs 216 in the first portion 212 of the pocket 210. The plurality of first cut-outs 216 may be provided to accommodate a plurality of fasteners 218 (e.g., keeper screws and washers, etc.) and a clearance may be provided to each of the plurality of fasteners 218. Each fastener of the plurality of fasteners 218 may be fastened to a corresponding first cut-out of the plurality of first cut-outs 216 and may secure the first clamp member 204 and the second clamp member 206 within the first portion 212. Specifically, a portion of each of the plurality of fasteners 218 may span horizontally to restrict a vertical movement of the first clamp member 204 and the second clamp member 206.

In FIG. 2A, each first cut-out of the plurality of first cut-outs 216 is shown to have a substantially C-shaped profile. However, disclosure may not be so limiting and in some embodiments, the plurality of first cut-outs 216 may have any other shape profile, including, but not limited to, a U-shaped profile, a V-shaped profile, or a hexagonal shape profile. In one or more embodiments, the first portion 212 may not include the plurality of first cut-outs 216. As an example, in certain instances, the vertical movement of the first clamp member 204 and the second clamp member 206 may be restricted based on modification of other features of the housing 202 and/or the first clamp member 204 and the second clamp member 206.

The first portion 212 of the pocket 210 may further include a plurality of second cut-outs 220. The plurality of second cut-outs 220 may provide a clearance for a smoother insertion of the first clamp member 204 and the second clamp member 206 within the first portion 212, and also for removal of the first clamp member 204 and the second clamp member 206 from the first portion 212. In FIG. 2A, the plurality of second cut-outs 220 are shown to have a C-shaped profile for facilitating the smoother insertion and/or removal of the first clamp member 204 and the second clamp member 206, respectively. However, disclosure may not be so limiting and in some embodiments, the plurality of second cut-outs 220 may have any other shape profile, including but not limited to, a U-shaped profile or a V-shaped profile. In one or more embodiments, the first portion 212 of the pocket 210 may not include the plurality of second cut-outs 220 and an interference fit may be provided between the first clamp member 204 and the first portion 212 of the housing 202 and further between the second clamp member 206 and the first portion 212 of the housing 202.

The second portion 214 of the pocket 210 may include a support hole 222 for securing the load measurement device 208 within the second portion 214 and to further restrict a movement of the load measurement device 208. The load measurement device 208 may include a rod support 224 which may extend inside the support hole 222 of the second portion 214 of the pocket 210 so as to secure the load measurement device 208 within the second portion 214 of the pocket 210. In an embodiment, a shim pack (not shown in FIG. 2A) may be provided in the second portion 214 to facilitate installation of different thicknesses of the load measurement device 208.

The second portion 214 of the pocket 210 may further include a plurality of third cut-outs 226. The plurality of third cut-outs 226 may provide a clearance for a smoother insertion of the load measurement device 208 within the second portion 214, and also for removal of the load measurement device 208 from the second portion 214. In FIG. 2A, the plurality of third cut-outs 226 is shown to have a C-shaped profile. However, the disclosure may not be so limiting and in some embodiments, the plurality of third cut-outs 226 may have any other shape profile, including but not limited to, a U-shaped profile or a V-shaped profile. In one or more embodiments, the second portion 214 of the pocket 210 may not include the plurality of third cut-outs 226.

Figure 2B:
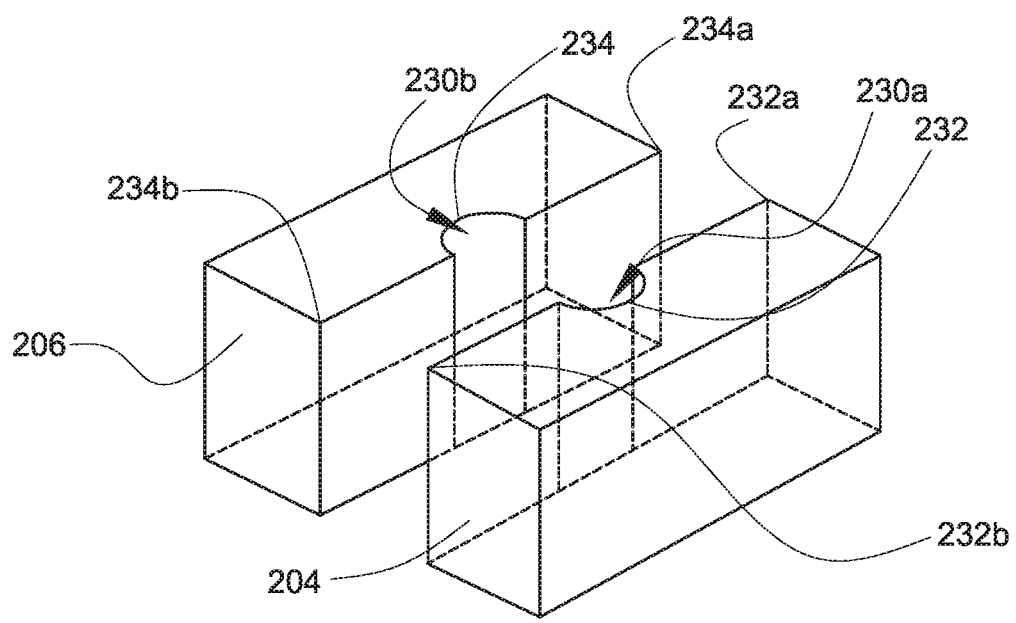
FIG. 2B illustrates a perspective view of clamp members of the load measuring arrangement of FIG. 2A, in accordance with an embodiment of the disclosure.
Figure 2C:
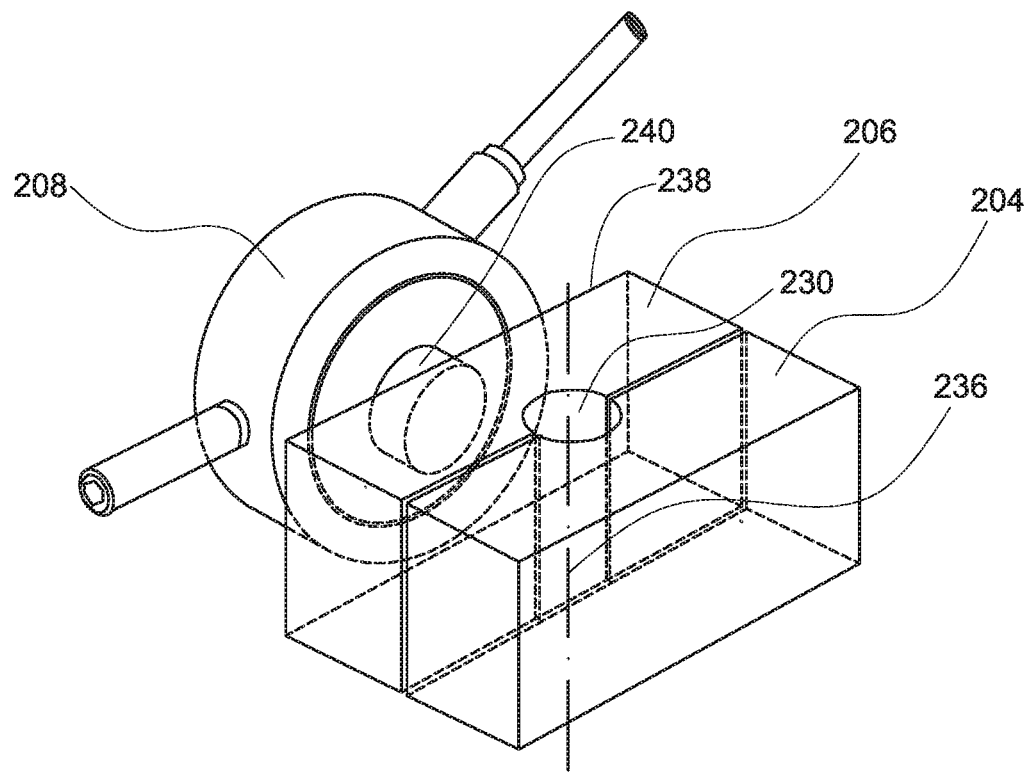
FIG. 2C illustrates a perspective view of an exemplary arrangement of clamp members of FIG. 2B with a load measurement device, according to at least one embodiment of the disclosure.

The load measurement device 208 may include a load-responsive portion (as shown in FIG. 2C) and a cable portion 228. The load measurement device 208 may be disposed next to the second clamp member 206 in the second portion 214 of the pocket 210 such that the load-responsive portion of the load measurement device 208 is configured to be in contact with the second clamp member 206. In FIG. 2A, the load measurement device 208 is shown to be a strain type compressive load cell. However, the disclosure may not be so limiting and in some embodiments, the load measurement device 208 may be different type of load cell, such as, but not limited to, a shear beam load cell, a bending beam load cell, a double ended shear beam load cell, or a piezoelectric load cell.

It should be noted here that the load measuring arrangement 200 may also include other components, which have been omitted from the present disclosure for the sake of brevity. Modifications and/or additions (e.g., in terms of design and arrangement) may be made to the load measuring arrangement 200, without departing from the scope of the present disclosure.

FIG. 2B illustrates a perspective view of clamp members of the load measuring arrangement of FIG. 2A, in accordance with an embodiment of the disclosure. FIG. 2B is explained in conjunction with elements from FIGS. 1 and 2A. With reference to FIG. 2B, there is shown a perspective view of the first clamp member 204 and the second clamp member 206. The first clamp member 204 may include a first groove 230a that may extend between two opposite surface portions 232a and 232b of the first clamp member 204. In FIG. 2B, the first groove 230a may be of a semi-circular profile and may be formed in a middle portion 232 of the first clamp member 204. However, the disclosure may not be so limiting and in some embodiments, the first groove 230a may be formed in a location other than the middle portion 232 of the first clamp member 204. Further, in certain embodiments, the first groove 230a may have a suitable surface profile (e.g., a toothed profile) which may help to securely hold onto the mounting member 106 of the collet assembly 100.

The second clamp member 206 may include a second groove 230b that may extend between two opposite surface portions 234a and 234b of the second clamp member 206. In FIG. 2B, the second groove 230b may be of a semi-circular profile and may be formed in a middle portion 234 of the second clamp member 206. However, the disclosure may not be so limiting and in some embodiments, the second groove 230b may be formed in a location other than the middle portion 234 of the second clamp member 206. Further, in certain embodiments, similar to the first groove 230a, the second groove 230b may also have a suitable surface profile which may help to securely hold onto the mounting member 106 of the collet assembly 100.

FIG. 2C illustrates a perspective view of an exemplary arrangement of clamp members of FIG. 2A with a load measurement device, according to at least one embodiment of the disclosure. FIG. 2C is explained in conjunction with elements from FIGS. 1, 2A, and 2B. With reference to FIG. 2C, there is shown a perspective view of an exemplary arrangement of the first clamp member 204 and the second clamp member 206 with the load measurement device 208.

In the exemplary arrangement, the first clamp member 204 and the second clamp member 206 may be configured to be arranged next to each other and disposed in the first portion 212 of the pocket 210 such that the first groove 230a and the second groove 230b may together form a receiving portion 230. In FIG. 2C, the receiving portion 230 is shown to have a substantially circular profile. However, the disclosure may not be so limiting and in some embodiments, the receiving portion 230 may be of a suitable shape profile, including but not limited to, a toothed (not shown), a hexagonal profile, and a frusto-conical profile for effectively gripping the mounting member 106 of the collet assembly 100. The first clamp member 204 and the second clamp member 206 may be positioned such that the first groove 230a is configured to be in contact with the second groove 230b to form the receiving portion 230. The receiving portion 230 may be configured to receive the collet assembly 100 along a first axis 236 and in a relaxed state. The load measurement device 208 may be arranged substantially perpendicular to the first axis 236 in the second portion 214 of the pocket 210. The second clamp member 206 may include a wall portion 238 which may be configured to be coupled to a load-responsive portion 240 of the load measurement device 208 such that a horizontal displacement of the second clamp member 206 may induce strain on the load-responsive portion 240 of the load measurement device 208.

Figure 3:
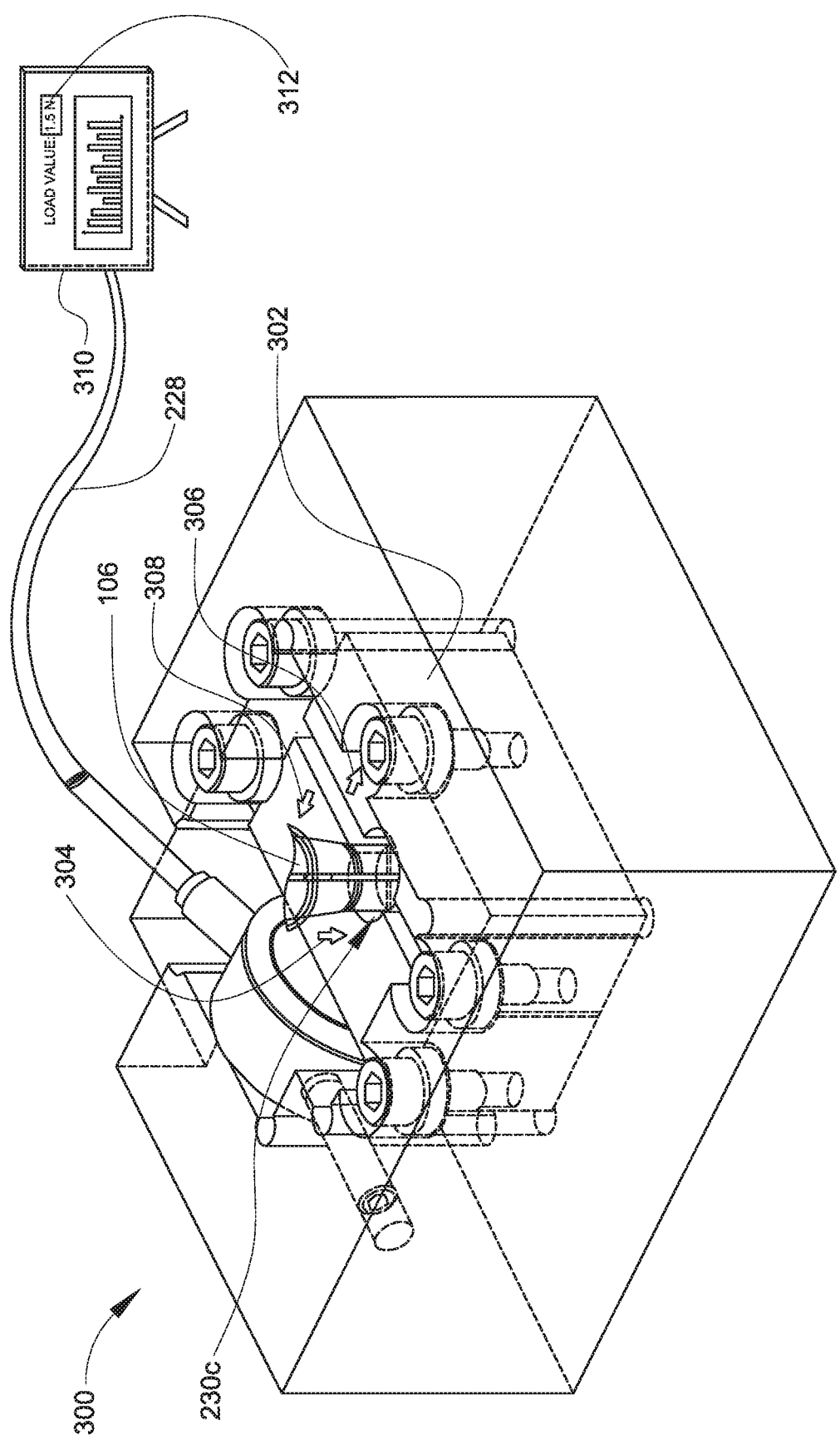
FIG. 3 illustrates a first configuration of the load measuring arrangement of FIG. 2A for measurement of a clamping force of a collet assembly, in accordance with an embodiment of the disclosure.

FIG. 3 illustrates a first configuration of the load measuring arrangement of FIG. 2A for measurement of a clamping force of a collet assembly, in accordance with an embodiment of the disclosure. FIG. 3 is explained in conjunction with elements from FIGS. 1, 2A, 2B, and 2C. With reference to FIG. 3, there is shown a first configuration 300 of the load measuring arrangement 200. In the first configuration 300, the load measurement device 208 may be disposed next to the second clamp member 206 and secured to the second portion 214 of the pocket 210, such that the load-responsive portion 240 of the load measurement device 208 is in contact with the second clamp member 206. Further, when the receiving portion 230 receives the collet assembly 100, the first clamp member 204 may be pushed outwards against a wall 302 of the first portion 212 of the pocket 210 and the second clamp member 206 may be pushed outwards against the load-responsive portion 240. As an example, the first clamp member 204 and the second clamp member 206 may be pushed laterally outwards from a diametrical surface 230c of the receiving portion 230. The load measurement device 208 may be configured to measure a load value corresponding to a load exerted laterally on the second clamp member 206 when the receiving portion 230 receives the collet assembly 100. The measured load value may correspond to an unrelaxed state of the receiving portion 230.

In order to measure the load value corresponding to the load of the collet assembly 100 that may exert laterally on the second clamp member 206, the mounting member 106 of the collet assembly 100 may need to be inserted in the receiving portion 230 of the load measuring arrangement 200. In accordance with an embodiment, a second diameter 242 of the receiving portion 230 may be equal to the first diameter 114 of the mounting member 106 of the collet assembly 100. Also, the first diameter 114 of the mounting member 106 of the collet assembly 100 may vary along a length of the mounting member 106.

Before insertion of the mounting member 106 in the receiving portion 230, the mounting member 106 may be positioned along the first axis 236 and the load measuring arrangement 200 may be set in the relaxed state. Upon insertion of the mounting member 106 in the receiving portion 230 along a first direction 304, the mounting member 106 may expand in a radially outward direction and apply a load/stress on the receiving portion 230. The load/stress on the receiving portion 230 may separate the first clamp member 204 from the second clamp member 206 and may further push the first clamp member 204 in a second direction 306 and the second clamp member 206 a third direction 308. The second direction 306 and the third direction 308 may be substantially opposite to each other and substantially perpendicular to the first direction 304.

During insertion of the mounting member 106, the first clamp member 204 may be pushed towards the wall 302 of the housing 202 and the second clamp member 206 may be pushed towards the load-responsive portion 240. The load-responsive portion 240 may measure the load value of a load/strain caused by the insertion of the mounting member 106 and may communicate the measured load value to an external input/output (I/O) device 310, via a communication media, for example, the cable portion 228.

The external I/O device 310 may include a gage display 312. The gage display 312 may be electronically coupled to the load measurement device 208 for displaying the measured load value exerted laterally on the second clamp member 206. In certain embodiments, the external I/O device 310 may further include a processor (not shown in FIG. 3) which may be communicatively coupled to the gage display 312 and the load measurement device 208. The processor configured to receive strain measurement information, including the measured load value from the load measurement device 208, via the communication media. Further, the processor may be configured to process the received strain measurement information to output recommendation information which may be indicative of whether the received collet assembly 100 is suitable for use in a specific machining process. Further, the processor may instruct the gage display 312 to output the received strain measurement information and the recommendation information.

In one or more embodiments, the load measuring arrangement 200 may further include a resilient mechanical structure (not shown in FIG. 3). The resilient mechanical structure may facilitate resetting positions of the first clamp member 204 and second clamp member 206 from the engaged state to the relaxed state when the collet assembly 100 disengages from the receiving portion 230. Examples of the resilient mechanical structure may include, but are not limited to, a spring, an electromagnetic solenoid-type biasing system, or a hydraulically/pneumatically controlled biasing system.

Figure 4:
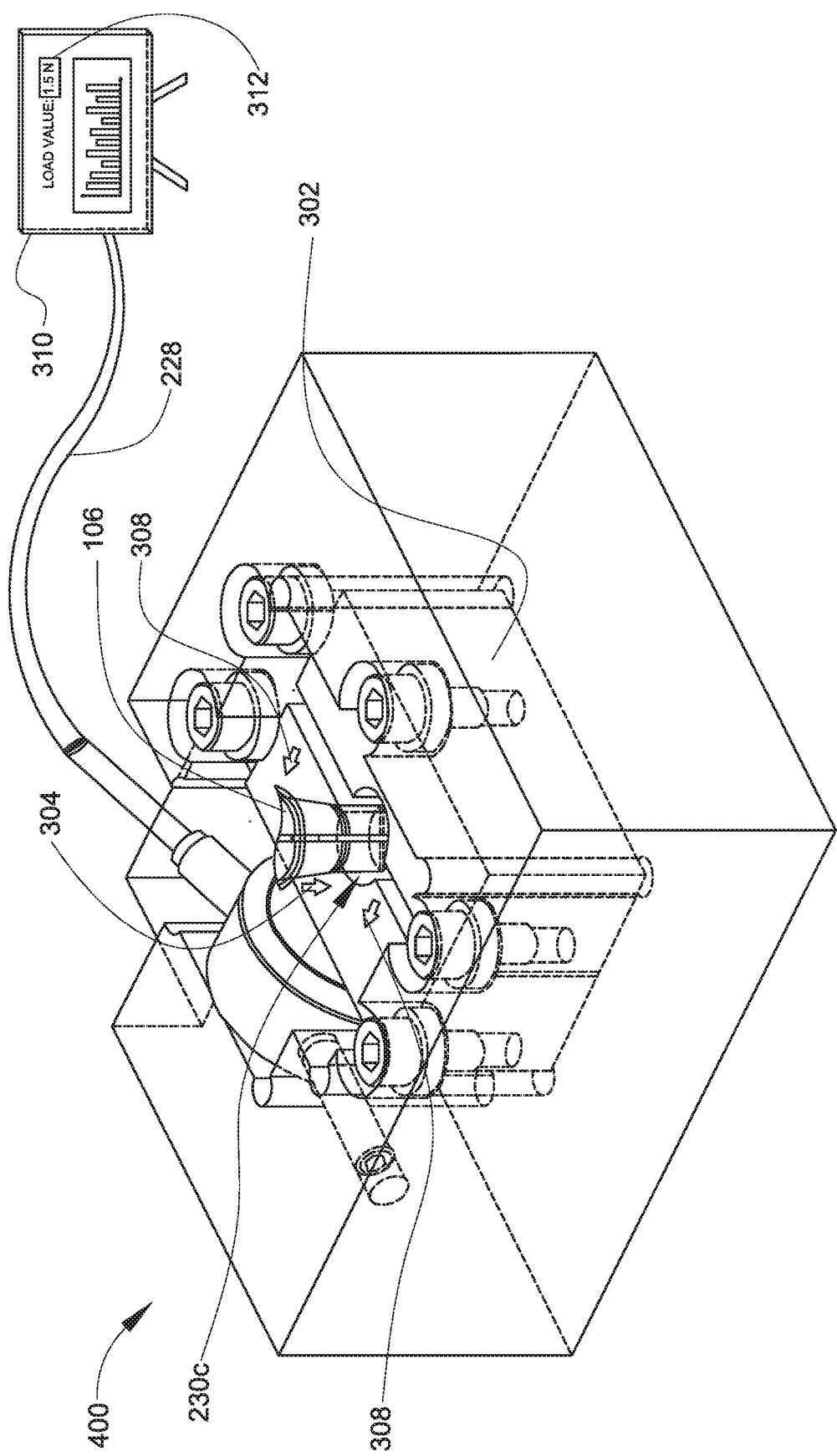
FIG. 4 illustrates a second configuration of the load measuring arrangement of FIG. 2A for measurement of a load exerted by a collet assembly, in accordance with an alternate embodiment of the disclosure.

FIG. 4 illustrates a second configuration of the load measuring arrangement of FIG. 2A for measurement of a load exerted by a collet assembly, in accordance with an alternate embodiment of the disclosure. FIG. 4 is explained in conjunction with elements from FIGS. 1, 2A, 2B, 2C, and 3. With reference to FIG. 4, there is shown a second configuration 400 of the load measuring arrangement 200. The second configuration 400 may be an alternative to the first configuration 300. In the second configuration 400, the load measurement device 208 may be disposed next to the second clamp member 206 and secured to the second portion 214 of the pocket 210 such that the load-responsive portion 240 of the load measurement device 208 is in contact with the second clamp member 206. The first clamp member 204 may be fixed to the wall 302 of the first portion 212 of the pocket 210. Further, when the receiving portion 230 receives the collet assembly 100, the second clamp member 206 may be pushed outwards against the load-responsive portion 240. As an example, the second clamp member 206 may be pushed laterally outwards from the diametrical surface 230c of the receiving portion 230, whereas the first clamp member 204 remains fixed. The load measurement device 208 may be configured to measure the load value corresponding to the load exerted laterally on the second clamp member 206 when the receiving portion 230 receives the collet assembly 100. The measured load value may correspond to the unrelaxed state of the receiving portion 230.

In order to measure the load value corresponding to the load of the collet assembly 100 that may be exerted laterally on the second clamp member 206, the mounting member 106 of the collet assembly 100 may need to be inserted in the receiving portion 230 of the load measuring arrangement 200. Before insertion of the mounting member 106 in the receiving portion 230, the mounting member 106 may be positioned along the first axis 236 and the load measuring arrangement 200 may be set in the relaxed state. Upon insertion of the mounting member 106 in the receiving portion 230 along the first direction 304, the mounting member 106 may expand in the radially outward direction, and apply a load/stress on the receiving portion 230. The load/stress on the receiving portion 230 may separate the second clamp member 206 from the first clamp member 204 and may further push the second clamp member 206 in the third direction 308. The third direction 308 may be substantially perpendicular to the first direction 304.

During insertion of the mounting member 106, the second clamp member 206 may be pushed towards the load-responsive portion 240. The load-responsive portion 240 may measure the load value of a load/strain caused by the insertion of the mounting member 106 and may communicate the measured load value to the external I/O device 310, via the communication media, for example, the cable portion 228.

Figure 5:
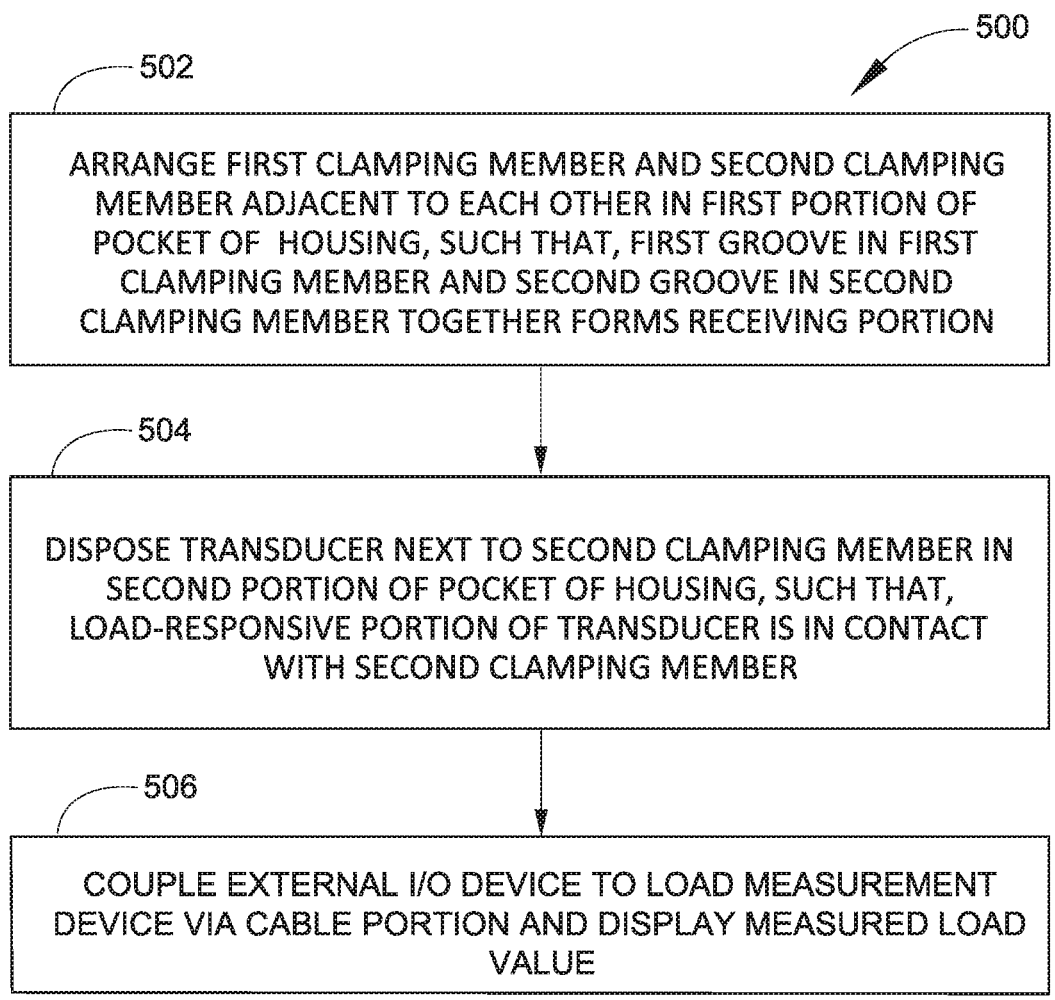
FIG. 5 is a flowchart that illustrates an exemplary method for assembling the load measuring arrangement of FIG. 2A, in accordance with an embodiment of the disclosure.

FIG. 5 is a flowchart that illustrates an exemplary method for assembling a load measuring arrangement, in accordance with an embodiment of the disclosure. FIG. 5 is explained in conjunction with elements from FIGS. 1, 2A, 2B, 2C, 3, and 4. With reference to FIG. 5, there is shown a flowchart 500 that depicts a method for assembling the load measuring arrangement 200. The method illustrated in the flowchart 500 may start from 502.

At 502, the first clamp member 204 and the second clamp member 206 may be arranged next to each other in the first portion 212 of the pocket 210 of the housing 202 such that the first groove 230a in the first clamp member 204 and the second groove 230b in the second clamp member 206 together forms the receiving portion 230.

At 504, the load measurement device 208 may be disposed next to the second clamp member 206 in the second portion 214 of the pocket 210 of the housing 202 such that the load-responsive portion 240 of the load measurement device 208 is in contact with the second clamp member 206.

At 506, the external I/O device 310 may be coupled to the load measurement device 208, via the cable portion 228 so as to enable the external I/O device 310 to display the load value measured by the load measurement device 208.

Although the flowchart 500 is illustrated as discrete operations, such as 502, 504, and 506. However, in certain embodiments, such discrete operations may be further divided into additional operations, combined into fewer operations, or eliminated, depending on the particular implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

The invention claimed is:

1. A load measuring arrangement for a collet assembly, the load measuring arrangement comprising:
a housing having a pocket including a first portion and a second portion;
a first clamp member having a first groove that extends between two opposite surface portions of the first clamp member;
a second clamp member having a second groove that extends between two opposite surface portions of the second clamp member,
wherein the first clamp member and the second clamp member are configured to be arranged next to each other and disposed in the first portion of the pocket such that the first groove and the second groove together forms
a receiving portion; and
a load measurement device disposed next to the second clamp member in the second portion of the pocket such that a load-responsive portion of the load measurement device is configured to be in contact with the second clamp member,
wherein the first clamp member is pushed outwards against a wall of the first portion of the pocket and the second clamp member is pushed outwards against the load-responsive portion when the receiving portion receives the collet assembly.

2. The load measuring arrangement according to claim 1, wherein the load measurement device is a strain-type compressive load cell.

3. The load measuring arrangement according to claim 1, wherein the receiving portion is configured to receive the collet assembly along a first axis and in a relaxed state.

4. The load measuring arrangement according to claim 3, wherein the load measurement device is arranged substantially perpendicular to the first axis in the second portion of the pocket.

5. The load measuring arrangement according to claim 1, wherein a second diameter of the receiving portion is equal to a first diameter of a mounting member of the collet assembly.

6. The load measuring arrangement according to claim 5, wherein the first diameter of the mounting member of the collet assembly varies along a length of the mounting member.

7. The load measuring arrangement according to claim 1, wherein the load measurement device is configured to measure a load value corresponding to a load exerted laterally on the second clamp member when the receiving portion receives the collet assembly.

8. The load measuring arrangement according to claim 7, wherein the load measurement device is electronically coupled to a gage display for displaying the load value exerted laterally on the second clamp member.

9. The load measuring arrangement according to claim 7, wherein the measured load value corresponds to an unrelaxed state of the receiving portion.

10. The load measuring arrangement according to claim 1, wherein the first clamp member and the second clamp member are pushed laterally outwards along a diametrical surface of the receiving portion.

11. The load measuring arrangement according to claim 1, wherein the first clamp member and the second clamp member are securely held within the first portion of the pocket using a set of fasteners.

12. A load measuring arrangement for a collet assembly, the load measuring arrangement comprising:
a housing having a pocket including a first portion and a second portion;
a first clamp member having a first groove;
a second clamp member having a second groove;

wherein the first clamp member and the second clamp member are configured to be arranged next to each other and disposed in the first portion of the pocket such that the first groove and the second groove together forms a receiving portion; and a load measurement device disposed next to the second clamp member and secured to the second portion of the pocket such that a load-responsive portion of the load measurement device is configured to be in contact with the second clamp member, wherein the second clamp member is pushed outwards against the load-responsive portion when the receiving portion receives the collet assembly.

13. The load measuring arrangement according to claim 12, wherein the first clamp member is fixed to a wall of the first portion of the pocket.

14. The load measuring arrangement according to claim 12, wherein the first clamp member is pushed outwards against a wall of the first portion of the pocket when the receiving portion receives the collet assembly.

15. The load measuring arrangement according to claim 12, wherein each of the first groove and the second groove is substantially a semicircular groove.

16. The load measuring arrangement according to claim 12, wherein the load measurement device is configured to measure a load value corresponding to a load exerted laterally on the second clamp member when the receiving portion receives the collet assembly.

17. The load measuring arrangement according to claim 16, wherein the load measurement device is electronically coupled to a gage display for displaying the load value exerted laterally on the second clamp member.

18. The load measuring arrangement according to claim 12, wherein the load measurement device is secured to the second portion of the pocket through a shim-pack.

19. The load measuring arrangement according to claim 12, wherein the second clamp member is pushed laterally outwards along a diametrical surface of the receiving portion.

20. A method of assembling a load measuring arrangement, the method comprising:

arranging a first clamp member and a second clamp member next to each other in a first portion of a pocket of a housing such that a first groove in the first clamp member and a second groove in the second clamp member together forms a receiving portion; and disposing a load measurement device next to the second clamp member in a second portion of the pocket of the housing such that a load-responsive portion of the load measurement device is in contact with the second clamp member, wherein the second clamp member is pushed outwards against the load-responsive portion when the receiving portion receives a collet assembly.

* * * * *